United States Patent
Ejiri et al.

(10) Patent No.: US 9,912,024 B2
(45) Date of Patent: Mar. 6, 2018

(54) BATTERY BLOCK AND BATTERY MODULE HAVING SAME

(71) Applicant: HITACHI AUTOMOTIVE SYSTEMS, LTD., Hitachinaka-shi, Ibaraki (JP)

(72) Inventors: Yuki Ejiri, Hitachinaka (JP); Naoki Kojima, Hitachinaka (JP); Michihiro Kimura, Hitachi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 384 days.

(21) Appl. No.: 14/435,697

(22) PCT Filed: Oct. 11, 2013

(86) PCT No.: PCT/JP2013/078391
§ 371 (c)(1),
(2) Date: Apr. 14, 2015

(87) PCT Pub. No.: WO2014/061814
PCT Pub. Date: Apr. 24, 2014

(65) Prior Publication Data
US 2015/0270589 A1    Sep. 24, 2015

(30) Foreign Application Priority Data

Oct. 18, 2012 (JP) ................ 2012-231143

(51) Int. Cl.
*H01M 10/6551* (2014.01)
*H01M 10/6561* (2014.01)
(Continued)

(52) U.S. Cl.
CPC ..... *H01M 10/6561* (2015.04); *H01M 2/1016* (2013.01); *H01M 2/1022* (2013.01);
(Continued)

(58) Field of Classification Search
CPC .......... H01M 10/6561; H01M 2/1022; H01M 2/1016; H01M 10/647; H01M 10/6557;
(Continued)

(56) References Cited

U.S. PATENT DOCUMENTS

2008/0118819 A1* 5/2008 Gamboa ............ H01M 2/0245
429/61
2010/0297486 A1   11/2010 Fujii
(Continued)

FOREIGN PATENT DOCUMENTS

CN    102054948 A    5/2011
EP    2 317 586 A1   5/2011
(Continued)

OTHER PUBLICATIONS

EESR issued on May 18, 2016 in EP Application No. 13846765.9.
Japanese Office Action dated Jan. 10, 2017 in the Japanese Application No. 2012-231143.

*Primary Examiner* — Lisa S Park
(74) *Attorney, Agent, or Firm* — Volpe and Koenig, P.C.

(57) ABSTRACT

The present invention addresses the problem of obtaining a battery capable of achieving a uniform temperature among a plurality of battery cells in a simple configuration while achieving size and weight reductions, and a battery module using the battery block. The battery block of the present invention has a structure such that a pair of end plates is disposed at both ends of a plurality of battery cells in an arranged direction; first spacers are disposed between the plurality of battery cells; and second spacers are disposed between the battery cells and the end plates. The first spacers have a space for allowing a flow of cooling gas. The second spacers block the flow of the cooling gas between the battery cells and the end plates and have a thermal insulating (Continued)

property for suppressing heat transmission between the battery cells and the end plates.

**11 Claims, 14 Drawing Sheets
(1 of 14 Drawing Sheet(s) Filed in Color)**

(51) Int. Cl.
| | | |
|---|---|---|
| *H01M 2/10* | (2006.01) | |
| *H01M 10/647* | (2014.01) | |
| *H01M 10/6557* | (2014.01) | |
| *H01M 10/617* | (2014.01) | |
| *H01M 10/613* | (2014.01) | |
| *H01M 10/658* | (2014.01) | |

(52) U.S. Cl.
CPC ....... *H01M 2/1077* (2013.01); *H01M 10/613* (2015.04); *H01M 10/617* (2015.04); *H01M 10/647* (2015.04); *H01M 10/658* (2015.04); *H01M 10/6557* (2015.04)

(58) Field of Classification Search
CPC ............. H01M 10/617; H01M 10/658; H01M 10/613; H01M 2/1077
See application file for complete search history.

(56) References Cited

U.S. PATENT DOCUMENTS

| | | |
|---|---|---|
| 2011/0104548 A1 | 5/2011 | Saito et al. |
| 2012/0040226 A1 | 2/2012 | Kim et al. |
| 2012/0286706 A1 | 11/2012 | Ohkura |
| 2013/0089763 A1 | 4/2013 | Lee |

FOREIGN PATENT DOCUMENTS

| | | |
|---|---|---|
| EP | 2 581 960 A1 | 4/2013 |
| JP | 2006-048996 A | 2/2006 |
| JP | 2008-186725 A | 8/2008 |
| JP | 2010-086843 A | 4/2010 |
| JP | 2011-096536 A | 5/2011 |
| JP | 2012-038709 A | 2/2012 |
| WO | 2011/089910 A1 | 7/2011 |

* cited by examiner

BATTERY BLOCK AND BATTERY MODULE HAVING SAME

TECHNICAL FIELD

The present invention relates to a battery block including a plurality of arranged and linked battery cells, and a battery module including the battery block.

BACKGROUND ART

In a battery block of recent years, a number of battery cells are arranged and secured with spacers disposed between the battery cells, and the end faces of the blocks are covered and secured by end plates. The end plates are formed in a size such that the battery cells exposed on the end faces can be covered. The end plates secure the battery cells by holding them integrally from both sides thereof in a direction in which the cells are arranged. Gas for cooling the battery cells is passed through gaps formed between the battery cells and between the battery cells and the end plates. The gas absorbs heat from the battery cells, thereby cooling the battery cells (see Patent Literature 1, for example).

CITATION LIST

Patent Literature

Patent Literature 1: JP 2008-186725 A

SUMMARY OF INVENTION

Technical Problem

However, in the technology according to Patent Literature 1, the battery cells disposed adjacent to the end plates are subjected to not only the absorption of heat by the cooling gas that passes through the gap from the end plates and the gap from the battery cells disposed on the opposite side from the end plates, but also to the absorption of heat by heat transfer to the end plates. As a result, the temperature of the adjacent battery cells becomes lower than that of the other battery cells. This creates a concern that the battery cells in the battery block fail to have a uniform temperature.

When a number of battery cells are disposed for the purpose of ensuring electricity storage capacity or increasing voltage, the volume of the cells is increased, making it necessary to minimize air passageways.

The present invention was made in view of the above problems, and an object of the present invention is to provide a battery block such that the temperature of a plurality of battery cells can be made uniform in a simple configuration while achieving a decrease in size, and to provide a battery module using the battery block.

Solution to Problem

A battery block according to the present invention that solves the problems includes a plurality of arranged battery cells; a pair of end plates disposed at both ends of the plurality of battery cells in an arranged direction; a plurality of first spacers respectively disposed between the plurality of battery cells and having a space allowing a flow of cooling gas; and second spacers respectively disposed between the battery cells and each end plate and having a thermal insulating property for suppressing heat transmission between the battery cells and each end plate.

Advantageous Effects of Invention

According to the battery block of the present invention, an increase in temperature difference between the battery cells adjacent to the end plates and the other battery cells can be prevented, the temperature of the plurality of battery cells can be made uniform, and the size of the battery block can be decreased.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 7 is an exploded perspective view of an end plate and the battery cell with the second spacer disposed between.

DESCRIPTION OF EMBODIMENTS

In the following, an embodiment of a battery module according to the present invention will be described in detail with reference to the drawings.

Figure 1:
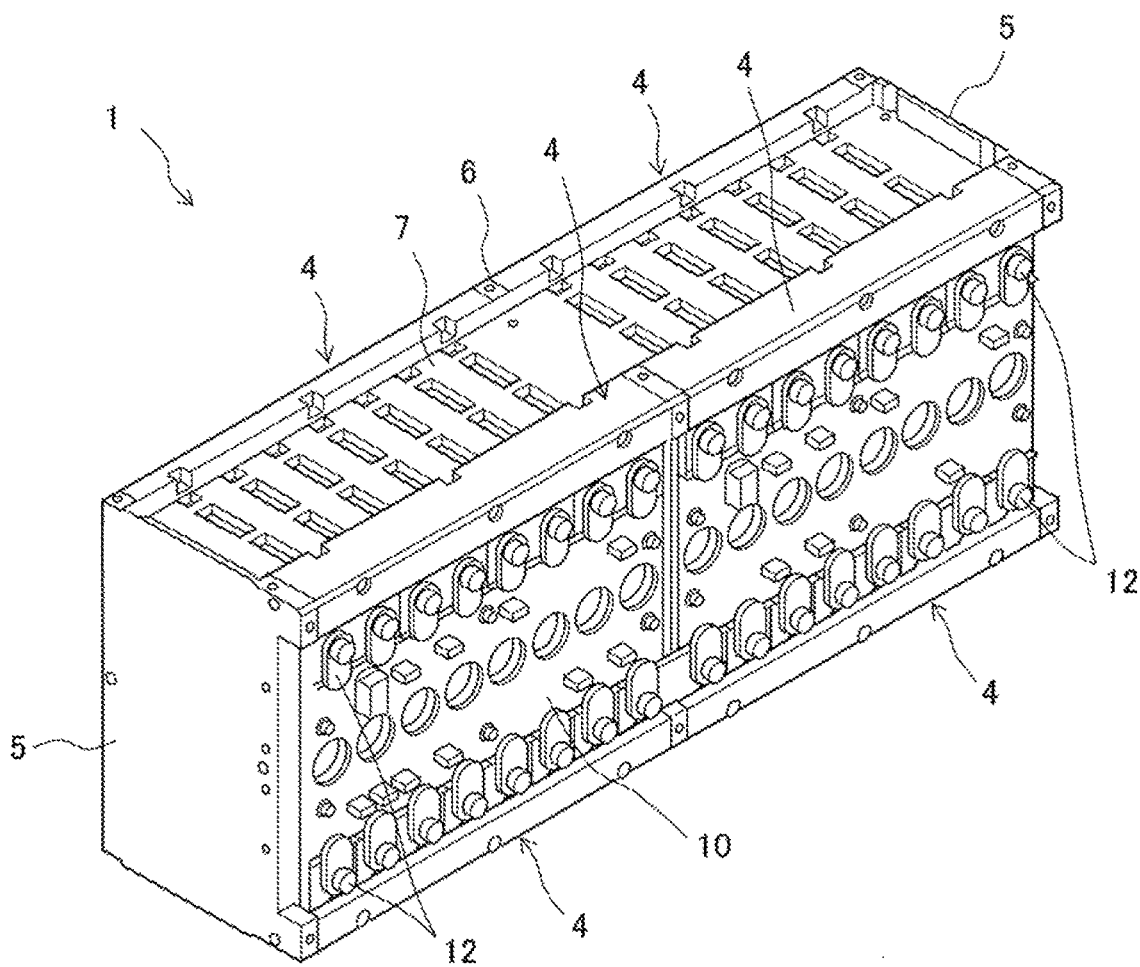
FIG. 1 is an exterior perspective view of a battery block included in a battery module according to the present embodiment.
Figure 2:
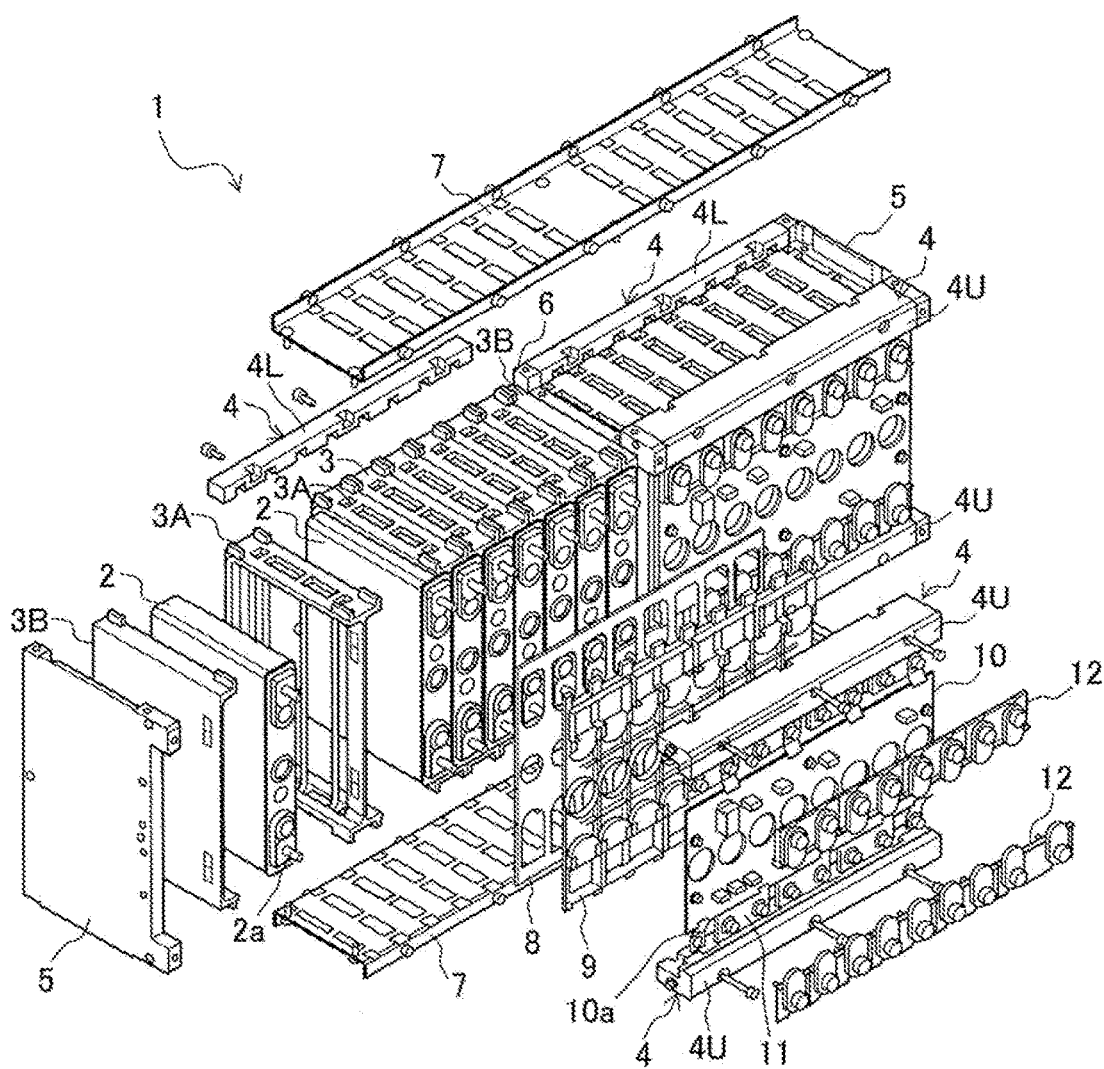
FIG. 2 is a perspective view of the battery block of FIG. 1 in a partially exploded state.

FIG. 1 is an exterior perspective view of a battery block according to the present embodiment. FIG. 2 is a perspective view of the battery block of FIG. 1 in a partially exploded state.

As shown in FIG. 2, for example, the battery block 1 has a configuration in which a plurality of battery cells 2 is arranged. The battery block 1 also includes a plurality of spacers 3 disposed between the plurality of battery cells 2, and bridge bars 4 extending along an arranged direction of the plurality of battery cells 2 and engaging the plurality of spacers 3.

The battery block 1 further includes a pair of end plates 5, 5 made of aluminum alloy that are disposed on both ends in the arranged direction of the plurality of battery cells 2, holding the battery cells 2 from both sides thereof in the arranged direction; a section plate 6 made of aluminum alloy that is disposed at an intermediate position in the arranged direction of the plurality of battery cells 2 and that partitions the plurality of battery cells 2 into one side and the other side in the arranged direction; and a pair of connection plates 7 disposed along both ends of the plurality of battery cells 2 in a cell width direction and that extend from one end to the other end in the arranged direction. To the connection plates 7, the pair of end plates 5, 5, the section plate 6, and the bridge bars 4 are secured. The battery cells 2 are covered on top in a cell height direction with seal sheets 8 and insulating covers 9 which are respectively bordered by the section plate 6. On top of the insulating covers 9, substrate units 10 are disposed. A plurality of the section plates 6 may be disposed between the pair of end plates 5, 5 at predetermined intervals.

The plurality of battery cells 2 is disposed with positive electrode external terminals 2a and negative electrode external terminals 2b being alternately continuous along the arranged direction. The positive electrode external terminals 2a and the negative electrode external terminals 2b of mutually adjacent battery cells 2 are respectively connected by a plurality of bus bars 11. Each of the bus bars 11 is connected to a connection terminal 10a of the substrate unit 10. The substrate unit 10 includes a circuit for measuring the voltage of each battery cell 2, a fuse, and the like. On top of the substrate unit 10 in the cell height direction, terminal caps 12 are disposed. The terminal caps 12 fit with the insulating covers 9 and covers the terminals of the battery cells 2.

Figure 3:
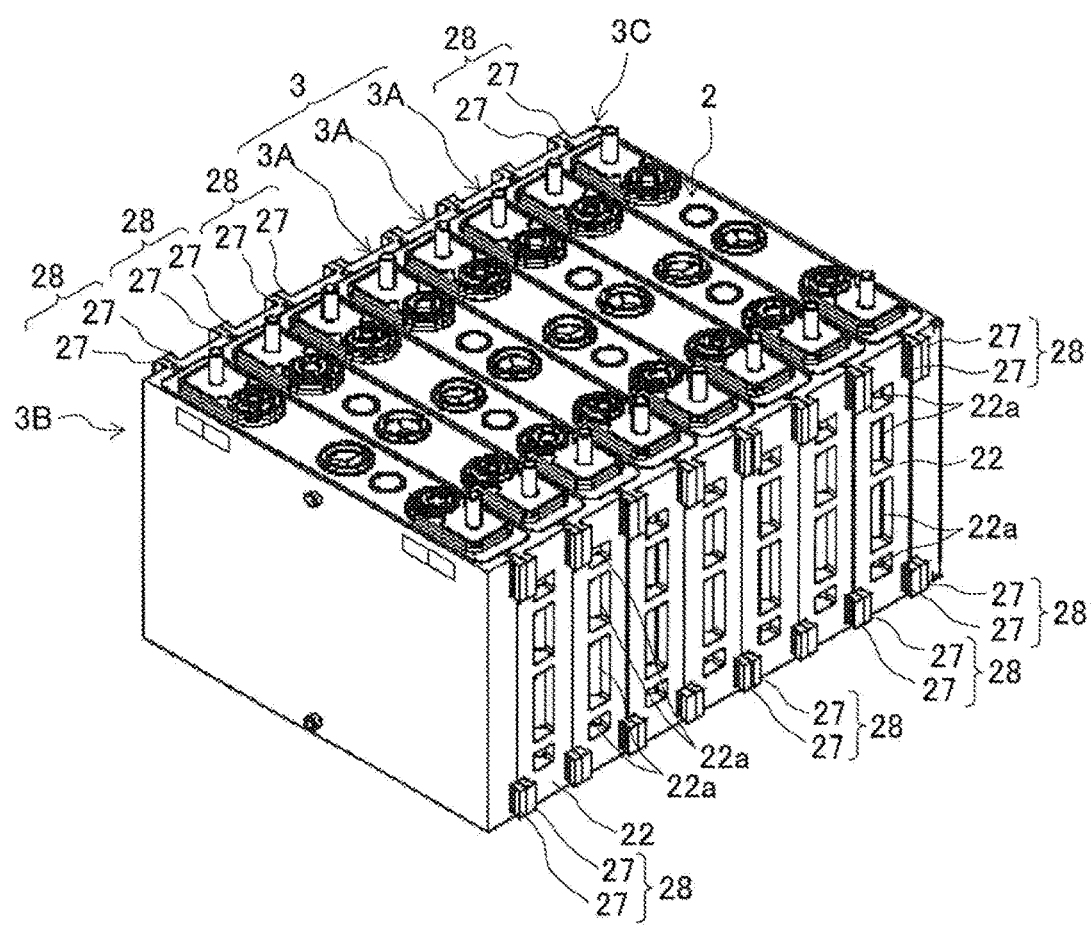
FIG. 3 is a perspective view of a plurality of battery cells fitted with first spacers and second spacers.
Figure 4:
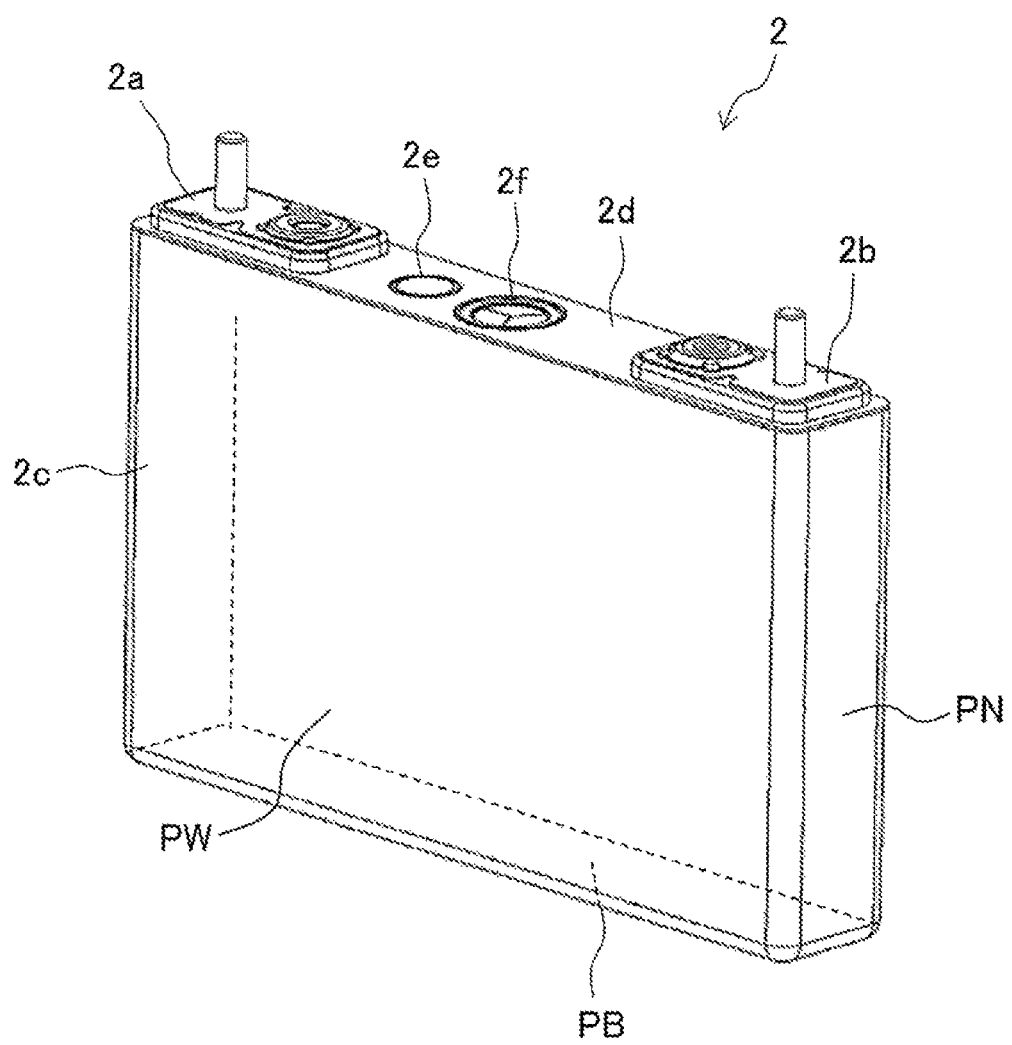
FIG. 4 is a perspective view of a battery cell.
Figure 5:
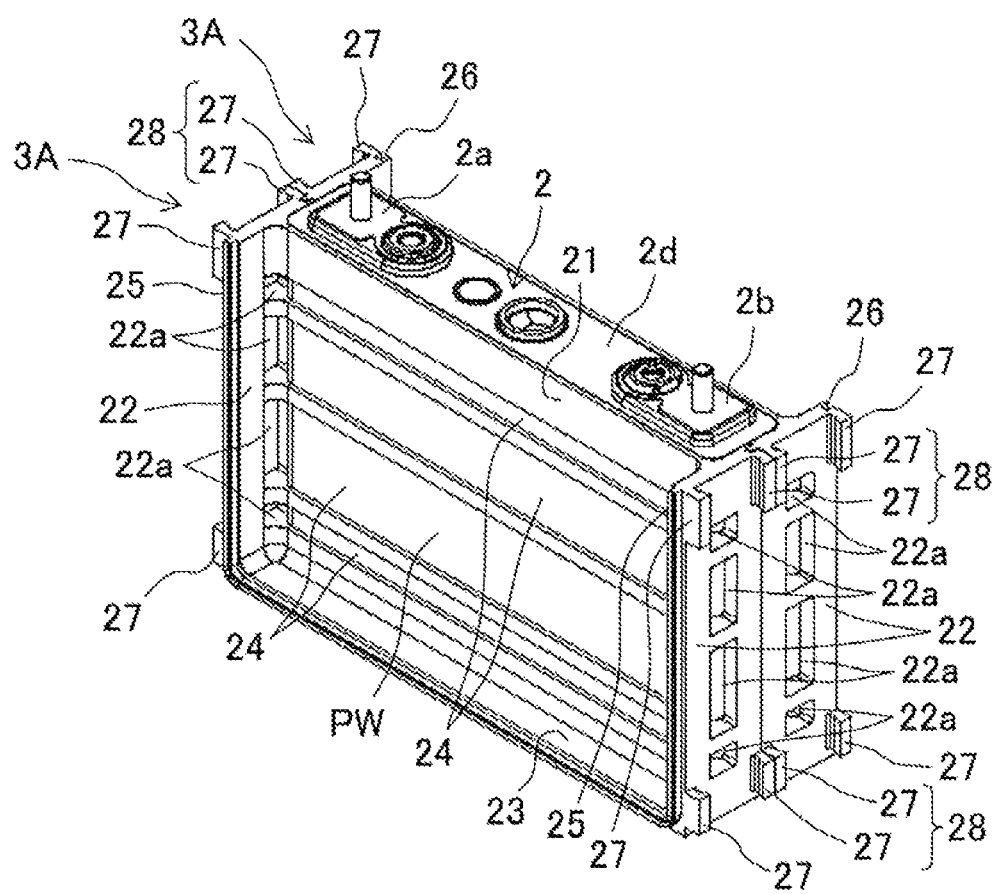
FIG. 5 is a perspective view for describing a configuration of the first spacers and the battery cell.
Figure 6:
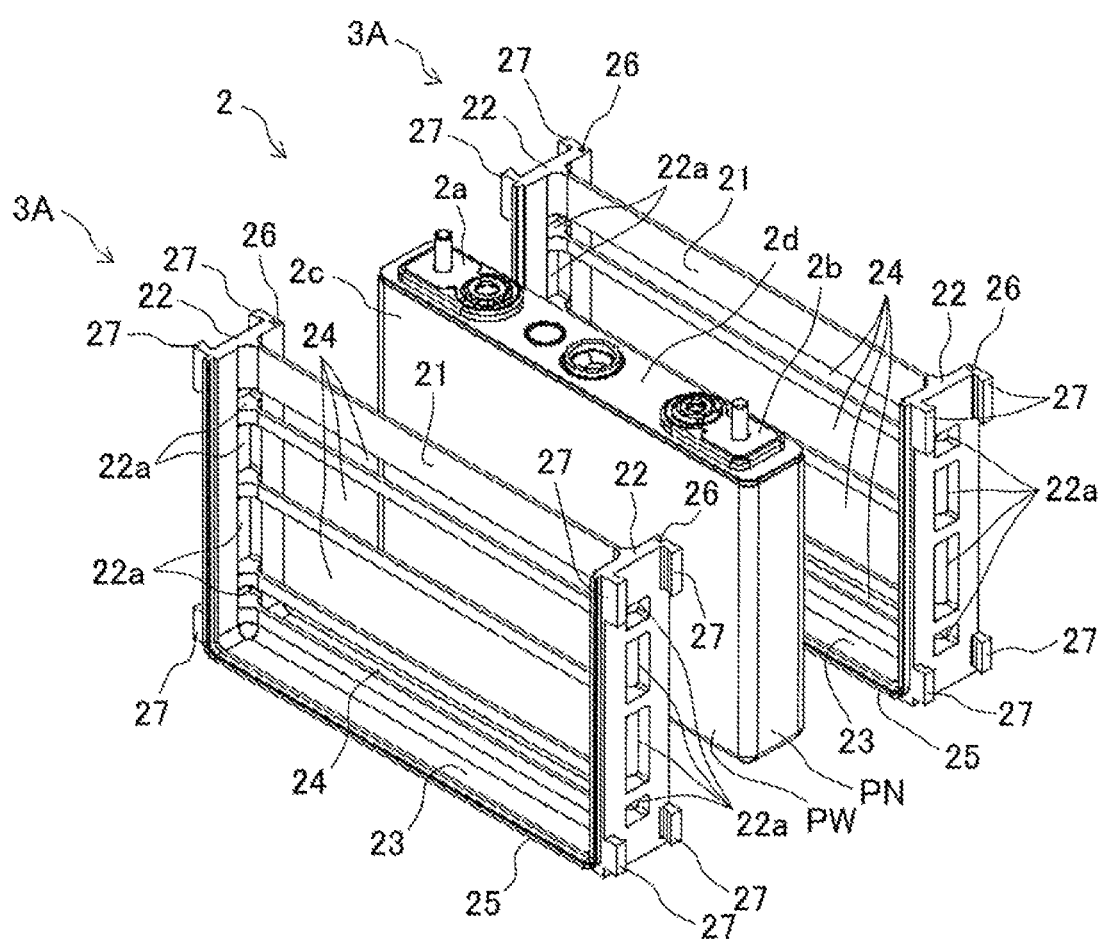
FIG. 6 is an exploded perspective view of the first spacers and the battery cell of FIG. 5.

FIG. 3 is a perspective view of the plurality of battery cells interposed with the spacers. FIG. 4 is a perspective view of a battery cell. FIG. 5 is a perspective view for describing a configuration of the spacers and the battery cell. FIG. 6 is an exploded perspective view of the spacers and the battery cell illustrated in FIG. 5.

The battery cells 2 are lithium ion secondary batteries of the same configuration. As illustrated in FIG. 4, the battery cell 2 is a flat and box-shaped rectangular battery including the positive electrode external terminal 2a and the negative electrode external terminal 2b for the input and output of electric power.

While not described in detail, the battery cell 2 includes a group of electrodes including a positive electrode and a negative electrode which are flatly wound around a plate-shaped core of resin via a porous and insulating separator. The positive electrode includes a positive electrode metal foil of metal, such as aluminum, and a positive electrode mixture layer coated on front and rear surfaces of the positive electrode metal foil. The negative electrode includes a negative electrode metal foil of a thin film of metal, such as copper, and a negative electrode mixture layer coated on front and rear surfaces of the negative electrode metal foil.

A positive electrode tab protruding from the positive electrode is ultrasonic-welded to a positive electrode current collector. The positive electrode current collector is connected to the positive electrode external terminal 2a. A negative electrode tab protruding from the negative electrode is ultrasonic-welded to a negative electrode current collector. The negative electrode current collector is connected to the negative electrode external terminal 2b. The external terminals 2a and 2b include protruding bolts for fastening the bus bars, so that the bus bars 11 can be secured with a nut. The battery cell 2 also includes a flat rectangular container 2c in which the electrode group provided with the positive electrode external terminal 2a and the negative electrode external terminal 2b is housed, with an opening closed by a battery lid 2d. The battery lid 2d includes a fluid inlet 2e formed therein for injecting nonaqueous electrolytic solution into the rectangular container 2c. The rectangular container 2c includes a bottom surface PB which is substantially rectangular as viewed in plan; a pair of wider side surfaces PW bent from a pair of long sides of the bottom surface PB and facing each other; and a pair of narrower side surfaces PN bent from a pair of short sides of the bottom surface PB and facing each other.

When the battery cell 2 of the above configuration is exposed to a high temperature environment or subjected to electrode or separator degradation, external short-circuit, internal short-circuit due to battery shape deformation and the like, a rapid temperature increase due to forcible excessive-current charging by an external power supply, or overcharging with excessive voltage, the electrolytic solution may be decomposed or vaporized, producing gas. As the gas fills the rectangular container 2c, the pressure inside the battery increases. Thus, the battery lid 2d is provided with a gas release valve 2f for releasing the internal gas when the internal pressure of the rectangular container 2c reaches a predetermined value or above.

The gas release valve 2f includes thin portions formed in three directions for easy breaking by the increase in internal pressure. Thus, in the single battery cell 2, the upper opening of the rectangular container 2c is closed by the battery lid 2d. The battery lid 2d includes the positive electrode external terminal 2a and the negative electrode external terminal 2b. The fluid inlet 2e and the gas release valve 2f are formed in a center portion of the battery lid 2d.

The spacer 3 includes a plurality of first spacers 3A individually disposed between the plurality of battery cells 2; a second spacer 3B disposed between the battery cells 2 and the end plates 5; and a third spacer 3C disposed between the battery cells 2 and the section plate 6.

The first spacers 3A include notches 24 as a space for a flow of cooling air. The second spacer 3B has thermal insulating property for suppressing heat transmission between the battery cells 2 and the end plates 5. The third spacer 3C has thermal insulating property for suppressing heat transmission between the battery cells 2 and the section plate 6.

First, the structure of the first spacers 3A will be described.

The first spacer 3A is configured to hold the battery cell 2 between two of the first spacers 3A. The first spacer 3A is disposed between two battery cells 2.

As illustrated in FIG. 5 and FIG. 6, the first spacer 3A includes an opposite wall (first opposite wall) 21 opposite the wider side surface PW of the battery cell 2; a pair of side walls 22 facing each other at both ends of the opposite wall 21 in the cell width direction; and a bottom wall 23 linking lower ends of the pair of side walls 22.

The opposite wall 21 is dimensioned to be opposite the entire surface of the wider side surface PW of the battery cell 2. The opposite wall 21 is cut out along the cell width direction and thereby opened with constant height widths, forming a plurality of the notches 24. The notches 24 are in communication with opening portions 22a of the pair of side walls 22, forming spaces for a flow of cooling gas.

The pair of side walls 22 protrudes from both ends of the opposite wall 21 in the cell width direction toward the one side and the other side in the arranged direction, while extending with a constant width in the cell height direction. The pair of side walls 22 is each dimensioned to face the narrower side surfaces PN of each of the battery cells 2 which are disposed on the one side and the other side in the arranged direction with the opposite wall 21 disposed between the cells.

The bottom wall 23 protrudes from lower ends of the opposite wall 21 in the cell height direction toward the one side and the other side in the arranged direction while extending with a constant width in the cell width direction. The bottom wall 23 is dimensioned to face the bottom surface PB of each of the battery cells 2 which are disposed on the one side and the other side in the arranged direction with the opposite wall 21 disposed between the cells.

The pair of side walls 22 and the bottom wall 23 are configured such that, when a plurality of the spacers 3 is arranged, the ends on the one side and the other side in the arranged direction are abutted on the ends of the mutually adjacent spacers 3 on the one side and the other side in the arranged direction, so that the spacers 3 are continuous in the arranged direction. The ends of the pair of side walls 22 and the bottom wall 23 on the one side and the other side in the arranged direction are provided with fitting portions 25 and 26 configured to fit with the ends of the mutually adjacent spacers 3 on the one side and the other side in the arranged direction.

The pair of side walls 22 includes projection portions 27 configured to engage the bridge bars 4. The projection portions 27 are disposed at the ends on the one side and the other side in the arranged direction in an upper end portion and a lower end portion of the side walls 22. As illustrated in FIG. 5, when two of the spacers 3 are linked in the arranged direction, the projection portions 27 of one spacer 3 on the one side in the arranged direction are overlapped with the projection portions 27 of the other spacer 3 on the other side in the arranged direction, forming single integral projection portions 28.

The pair of side walls 22 is also provided with a plurality of opening portions 22a communicated with the respective notches 24 of the opposite wall 21. Thus, the cooling gas can enter via the opening portions 22a of the side wall 22 on one side in the cell width direction into the notches 24 of the opposite wall 21. The cooling gas can pass through the notches 24 and then flow out via the opening portions 22a of the side wall 22 on the other side in the cell width direction.

A configuration of the second spacer 3B and the third spacer 3C will be described.

Figure 7:
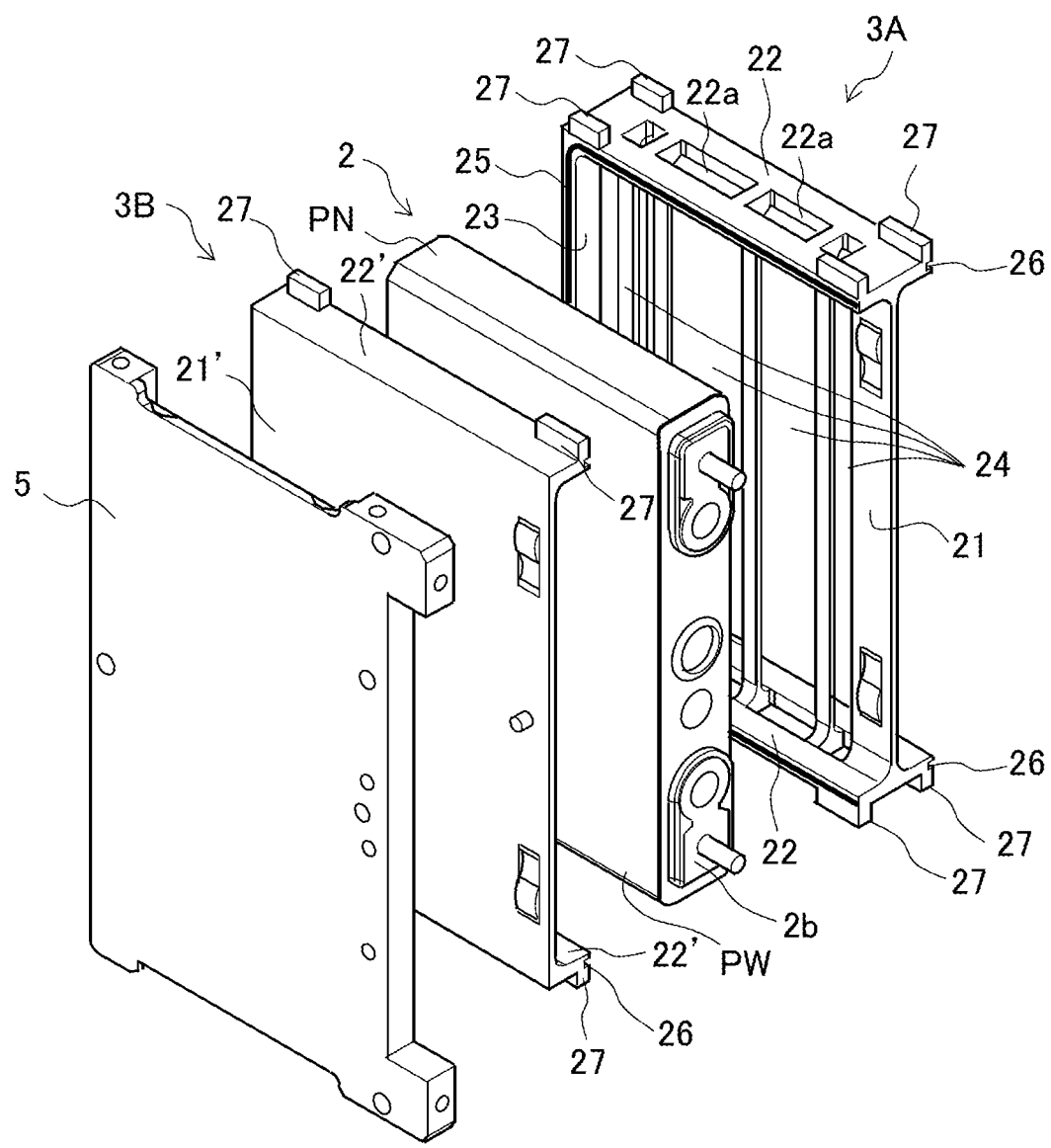
Figure 8:
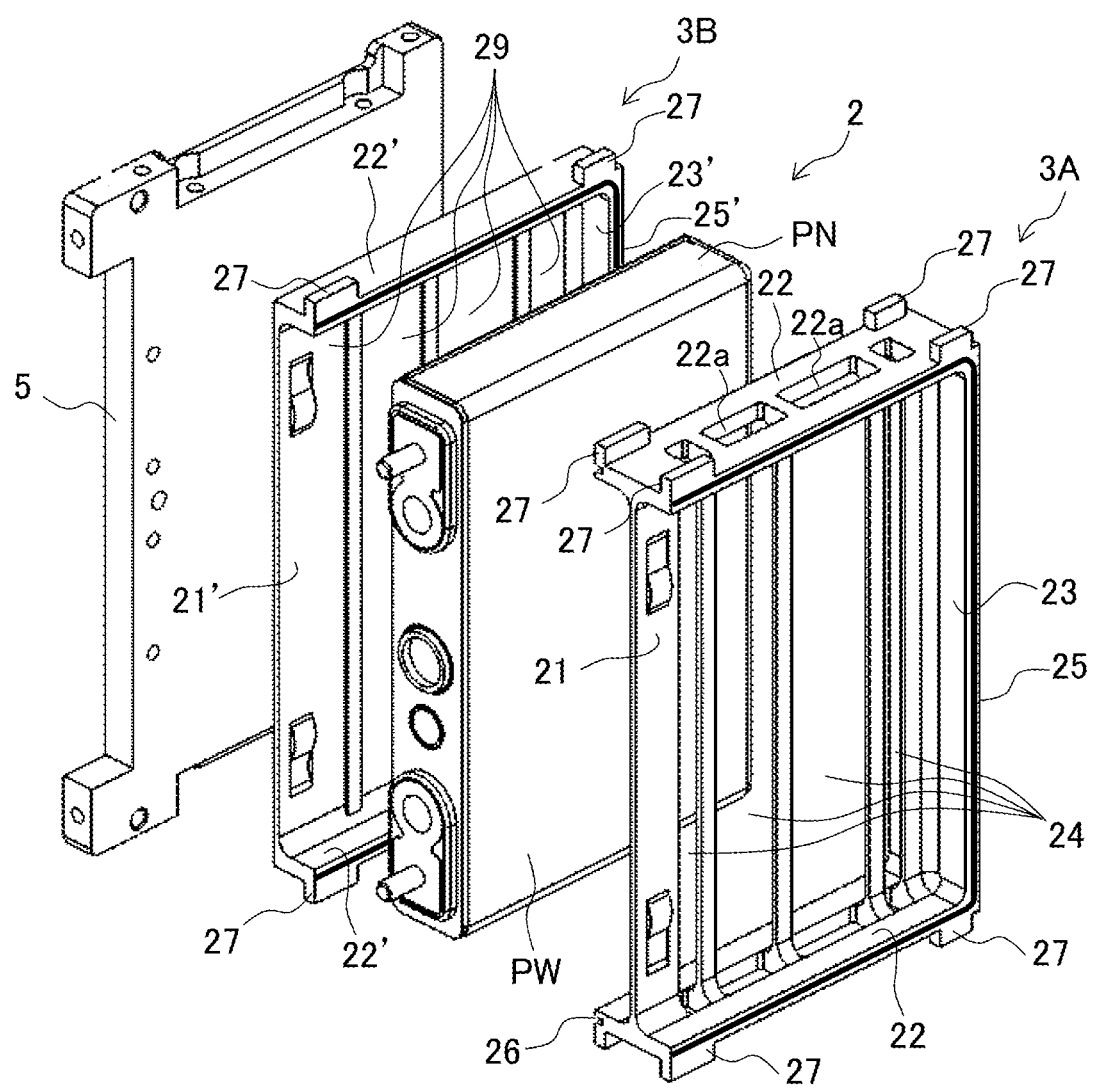
FIG. 8 is an exploded perspective view of the state of FIG. 7 from another angle.

FIG. 7 is an exploded perspective view of the end plate and the battery cell with the second spacer disposed between. FIG. 8 is an exploded perspective view of the state of FIG. 7 as viewed from another angle. Similar configuration elements to those of the first spacer 3A will be designated with similar signs with their detailed description omitted.

The second spacer 3B is made from a material with high thermal insulating property. According to the present embodiment, the second spacer 3B as a whole is made from a foam member. The second spacer 3B only needs to have thermal insulating property such that the heat transmission between the battery cell 2 and the end plate 5 can be suppressed. For example, the second spacer 3B may at least partially be formed from a foam member, such as by affixing a heat-insulating sheet of foam material onto a surface facing the battery cell 2.

The second spacer 3B has a configuration such that the flow of cooling gas between the battery cell 2 and the end plate 5 can be blocked. The second spacer 3B has roughly the outer shape of the first spacer 3A divided in half at the center in the arranged direction into the one side and the other side in the arranged direction. The second spacer 3B differs from the first spacer 3A in that the notches 24 and the opening portions 22a are not provided.

The second spacer 3B includes an opposite wall (second opposite wall) 21' opposite the entire surface of the wider side surface PW of the battery cell 2; a pair of side walls 2T facing each other at the ends of the opposite wall 2 in the cell width direction; and a bottom wall 23' linking lower ends of the pair of side walls 22'.

The opposite wall 21' is provided with hollow parts 29 on the side opposite the wider side surface PW of the battery cell 2. The hollow parts 29 are disposed at height positions facing the notches 24 of the first spacer 3A, and extend along the cell width direction of the battery cell 2 with the same height widths as the notches 24.

Thus, the battery cell 2 disposed between the second spacer 3B and the first spacer 3A is held between the opposite wall 21' of the second spacer 3B and the opposite wall 21 of the first spacer 3A from both sides in the arranged direction at the same height position and with the same height widths along the cell width direction.

Accordingly, when the battery cell 2 is expanded, the opposite wall 21' of the second spacer 3B and the opposite wall 21 of the first spacer 3A can be abutted on the pair of wider side surfaces PW of the battery cell 2 from both sides in the arranged direction at the same height positions and with the same height widths. Thus, the battery cell 2 can be uniformly pressed from both sides in the arranged direction, making the battery cell 2 to be uniformly deformed.

The pair of side walls 22' protrude in the arranged direction from the ends of the opposite wall 21' in the cell width direction while extending with a constant width in the cell height direction. The side walls 22' are dimensioned to cover a one-half region of the narrower side surfaces PN in the arranged direction while facing the narrower side surfaces PN of the battery cell 2.

The bottom wall 23' protrudes in the arranged direction from the lower end portion of the opposite wall 21' in the cell height direction while extending with a constant width in the cell width direction. The bottom wall 23' is dimensioned to cover a one-half region of the bottom surface PB of the battery cell 2 in the arranged direction while facing the bottom surface PB.

The pair of side walls 22' and the bottom wall 23' are configured such that their ends protruding in the arranged direction are abutted on the ends of the first spacer 3A, making the spacers 3 continuous with each other in the arranged direction. The ends of the pair of side walls 22' and the bottom wall 23' in the arranged direction are provided with a fitting portion 25' that fits with the ends of the first spacer 3A in the arranged direction for sealing purpose.

Because the side walls 22' of the second spacer 3B are not provided with the opening portions 22a, there is no flow of cooling gas in the hollow parts 29. Thus, the second spacer 3B can block the flow of cooling gas between the battery cell 2 and the end plate 5.

The third spacer 3C has a configuration similar to that of the second spacer 3B with the exception that the third spacer 3C is disposed between the battery cell 2 and the section plate 6. Thus, a description of the third spacer 3C will be omitted.

The bridge bar 4 includes a pair of lower bridge bars 4L mounted opposite the lower ends of the plurality of spacers 3, and a pair of upper bridge bars 4U mounted opposite the upper ends of the plurality of spacers 3.

Figure 9:
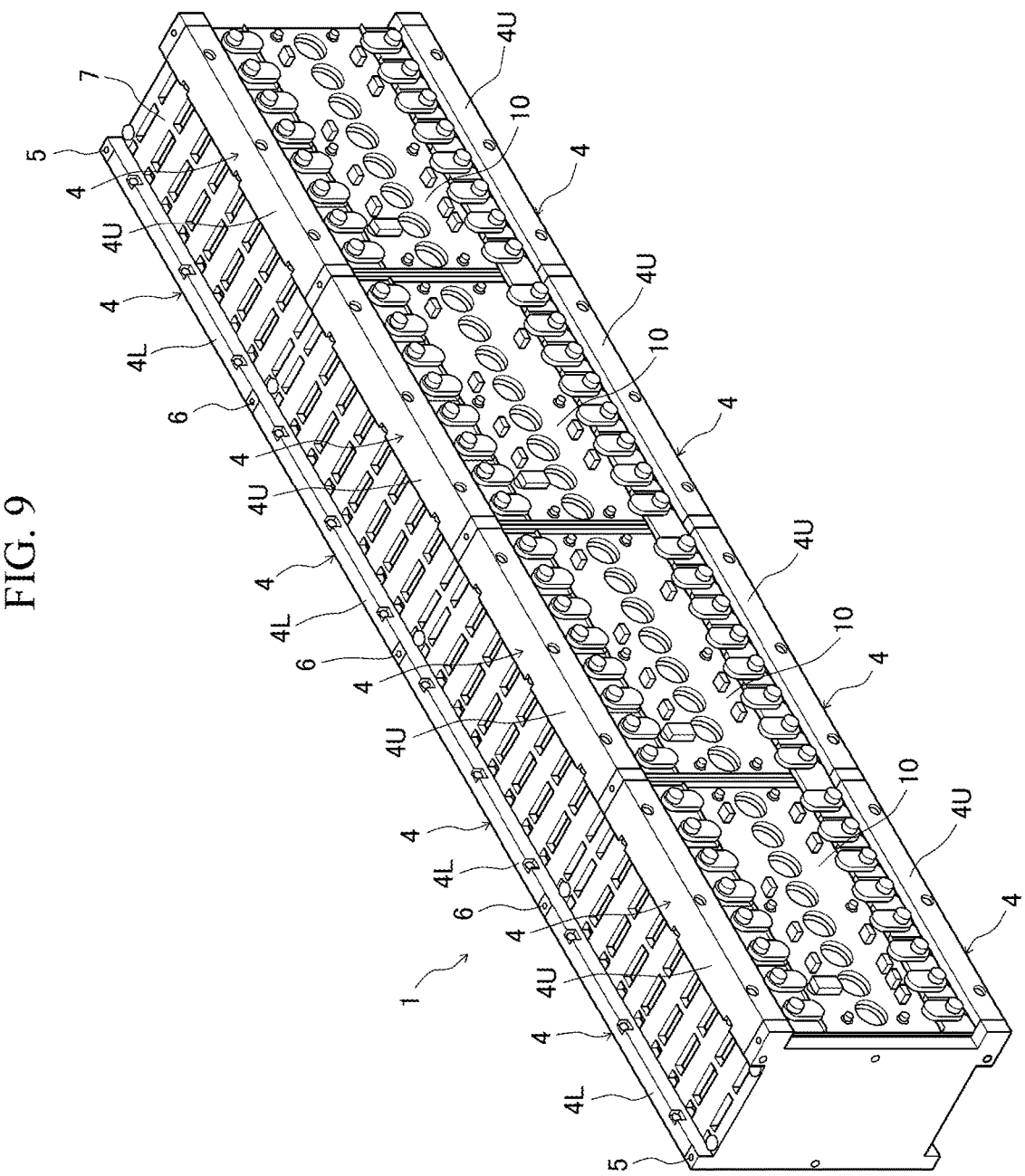
FIG. 9 is a perspective view of another example of the battery block.

The lower bridge bars 4L and the upper bridge bars 4U have a length extending between the end plate 5 and the section plate 6. The lower bridge bars 4L and the upper bridge bars 4U are provided with recess portions 31 that engage the projection portions 28 formed by mutually adjacent spacers 3. In the present embodiment, eight projection portions 28 are formed at predetermined intervals in the arranged direction. Thus, the lower bridge bars 4L and the upper bridge bars 4U are respectively provided with a total of eight recess portions 31 at the corresponding positions. As illustrated in FIG. 9, for example, the lower bridge bars 4L and the upper bridge bars 4U are mounted along the side walls 22 of the spacers 3 with the projection portions 28 being fitted in and engaged with the recess portions 31. In this way, the intervals of the respective spacers 3 in the arranged direction are regulated, whereby the spacers 3 can be positioned in the arranged direction.

The lower bridge bars 4L include a square column member with a rectangular cross section, and are mounted along the lower ends of the side walls 22 of the spacers 3. The lower bridge bars 4L are provided with the recess portions 31 in opposite surfaces opposite the side walls 22 of the spacers 3. Eight recess portions 31 are disposed along the longitudinal direction of the lower bridge bar 4L at predetermined intervals.

The upper bridge bars 4U include a bar-like member having L-shaped cross section, and is mounted along the upper ends of the side walls 22 of the spacers 3. The upper bridge bars 4U include one section opposite the side walls 22 of the spacers 3, and another section opposite the battery lids 2d of the battery cells 2. The one section of the upper bridge bars 4U is provided with the recess portions 31. Eight recess portions 31 are disposed along the longitudinal direction of the upper bridge bars 4U at predetermined intervals.

A method of assembling the battery block 1 illustrated in FIG. 1 will be described.

First, seven first spacers 3A are arranged between eight battery cells 2, and the second spacers 3B and the third spacers 3C are respectively mounted on both sides in the arranged direction. Then, the lower bridge bars 4L are mounted at the lower ends of the pair of side walls 22 of the respective spacers 3, with the projection portions 28 disposed at the lower ends of the side walls 22 engaging the recess portions 31 of the lower bridge bars 4L.

Then, a pair of upper bridge bars 4U is mounted on the upper side in the cell height direction of the battery cells 2 while holding the seal sheet 8 and the insulating cover 9 between, with the projection portions 28 disposed at the upper ends of the side walls 22 engaging the recess portions 31 of the upper bridge bars 4U. Thus, the eight battery cells 2 are integrally restrained while being held by the spacers 3, and are therefore prevented from being broken apart in the arranged direction. Thereafter, the external terminals of mutually adjacent battery cells 2 are connected by the bus bars 11, the substrate unit 10 is mounted, and then the terminal cap 12 is placed, whereby one assembled battery is formed.

Two of the assembled batteries are assembled and arranged in the arranged direction with the section plate 6 interposed, and the end plates 5 are disposed on both sides in the arranged direction. Between the end plates 5 and the battery cells 2, the second spacers 3B are disposed. Between the section plate 6 and the battery cells 2, the third spacers 3C are disposed. The pair of connection plates 7 is then brought closer from both sides in the cell width direction, and the end plates 5 and the section plate 6 are secured, while the lower bridge bars 4L and the upper bridge bars 4U are secured. The securing is performed by fastening screws.

In the battery block 1 of the above configuration, the plurality of spacers 3 can be positioned in the arranged direction and disposed as the lower bridge bars 4L and the upper bridge bars 4U are mounted. Thus, when the battery cells 2 are expanded by charging or discharging, the relative position of the respective battery cells 2 in the arranged direction can be prevented from being changed by differences in the degree of expansion of each battery cell 2, whereby the plurality of battery cells 2 can be relatively positioned in the arranged direction. Accordingly, the size of the bus bars 11 linking the respective battery cells 2, for example, can be accurately determined, facilitating the work of assembling the battery block 1.

Figure 10:
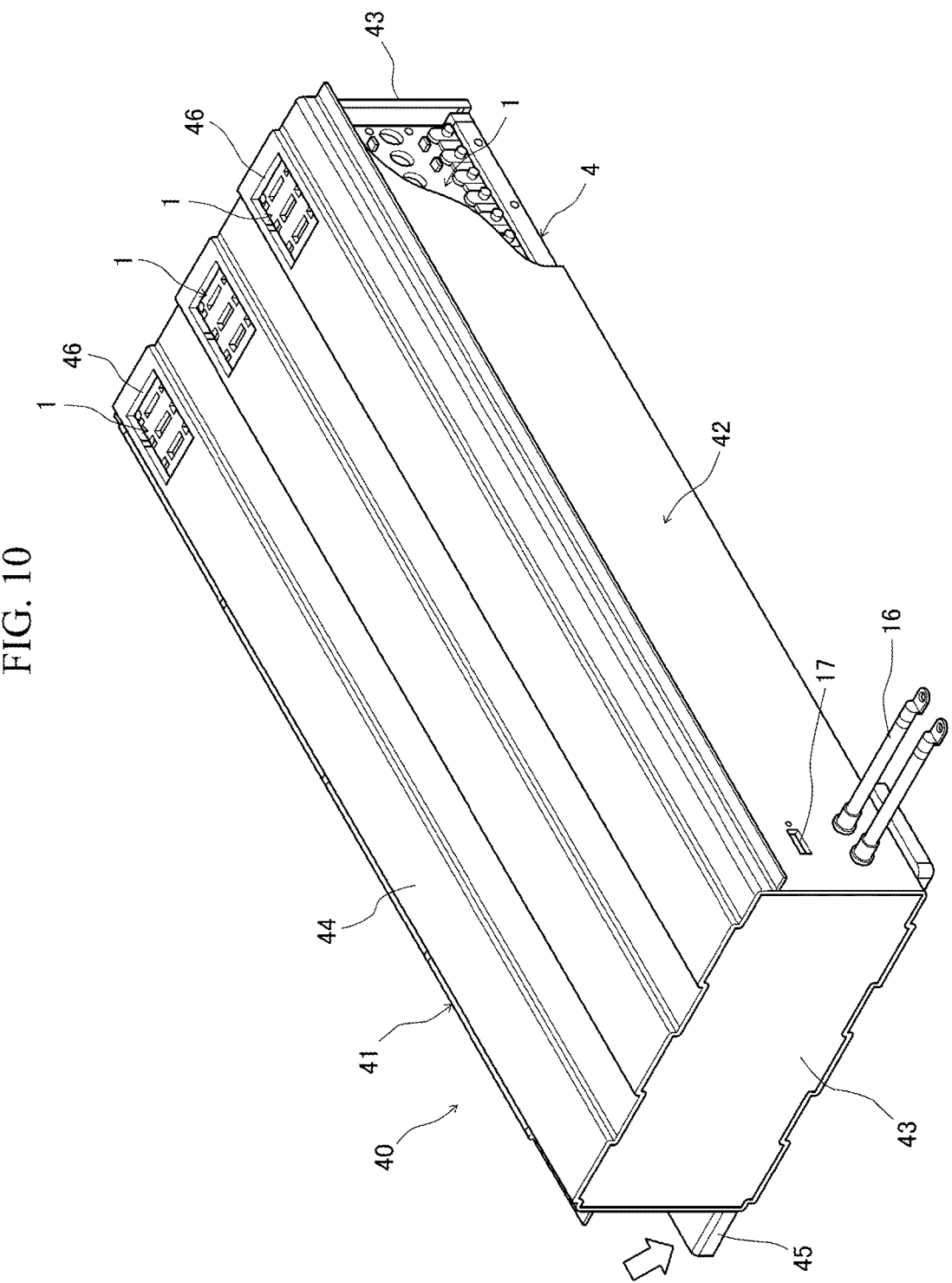
FIG. 10 is a perspective view of an example of a battery module using the battery blocks of FIG. 9.

FIG. 9 is a perspective view of another example of the battery block. FIG. 10 is a perspective view of an example of a battery module using the battery blocks of FIG. 9.

The battery block 1 illustrated in FIG. 9 includes four of the assembled batteries arranged in series, for a total of 32 battery cells 2. The section plate 6 is disposed for every eight battery cells 2, for a total of three section plates 6.

FIG. 10 is a perspective view of an example of the battery module using the battery blocks of FIG. 9, which is partially cut out for an interior view.

The battery module 40 includes the battery blocks 1 which are disposed sideways so that the external terminal 2a and 2b side of the battery cells 2 is on the side, and which are housed in a case 41. The case 41 includes a base 42 and a cover 44. The base 42 contacts the lower side of the battery block 1, and is secured to the end plates 5, 5 and the section plate 6. The cover 44 contacts the upper portion of the battery blocks 1, and is secured to the end plates 5, 5 and the section plate 6.

The cover 44 is also secured to outer periphery portions of the base 42 so that the case 41 as a whole is hermetically sealed. In this configuration, a space provided to allow for a flow of cooling gas between the cover 44 and the upper part of the battery blocks 1 and a space provided to allow for a flow of cooling gas between the base 42 and the lower part of the battery blocks 1 are communicated via the gaps between the plurality of battery cells 2.

The battery module 40 illustrated in FIG. 10 has the configuration in which three of the battery blocks 1 illustrated in FIG. 9 are arranged in parallel in the case 41. The case 41 includes the base 42, which has a U-cross section and which includes a substantially rectangular bottom surface portion and a pair of side surface portions bent upward from a pair of long side portions of the bottom surface portion and facing each other; side plates 43, 43 respectively closing ends of the base 42 on one side in the long side direction and ends of the base 42 on the other side in the long side direction; and the cover 44 closing the upper opening formed by the base 42 and the side plates 43.

The battery blocks 1 are secured in the case 41 with the ends of the end plates 5 and the section plates 6 on one side in the cell width direction being fastened to the base 42 while the ends thereof on the other side in the cell width direction being fastened to the cover 44.

In the case 41, a battery management system (BMS), which is not shown, is housed. A side surface of the case 41 is provided with a communication connector 17 for connection with the battery management system (BMS). Battery input/output lines 16 for the input and output of the battery cells 2 in the case 41 protrude from the side surface of the case 41.

In the lower surface of the case 41 on one end in the longitudinal direction, there is formed a cooling air inlet for introducing the cooling air, which is cooling gas, into the case 41. To the cooling air inlet, a duct 45 for supplying the cooling air is connected. In the upper surface of the case 41 on the other end portion in the longitudinal direction, there are formed cooling air exits 46 for guiding the cooling air out of the case 41.

In the battery module 40, the cooling air can be caused to flow into the battery block 1 via the duct 45 from one side (which is the lower side in the figure) of the battery blocks 1 in the cell width direction. The cooling air is passed between the battery cells 2 along the cell width direction so as to cool the battery cells 2. The air after cooling can then be caused to flow out of the battery blocks 1 on the other side in the cell width direction (which is the upper side in the figure), passed inside the case 41 along the upper portion thereof, and then discharged out of the cooling air exits 46.

Figure 11:
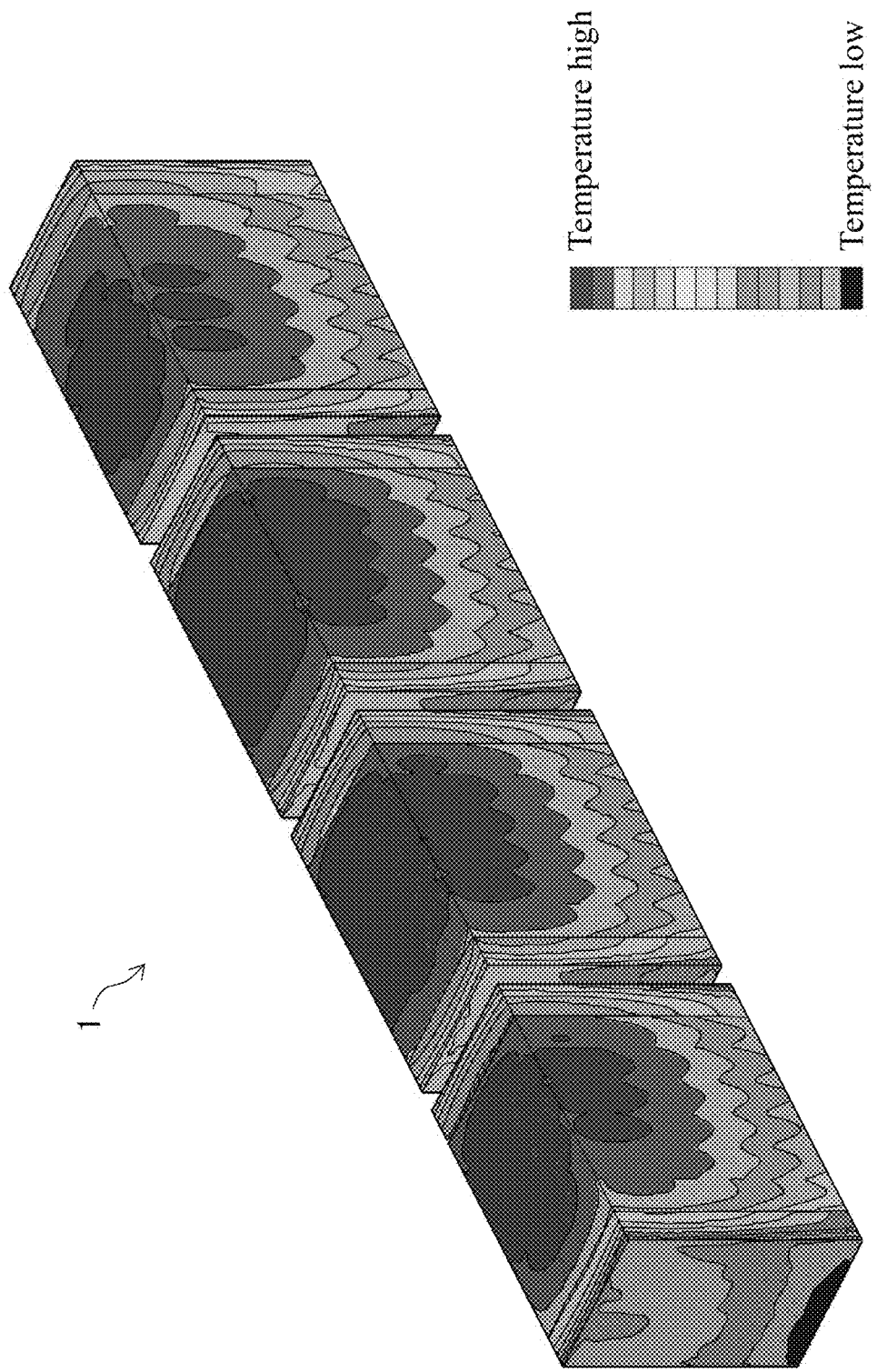
FIG. 11 illustrates a temperature distribution in conventional battery block in a battery module.

FIG. 11 illustrates a temperature distribution in a battery module of battery block in which, instead of the second spacers and the third spacers, spacers including cooling gas passageways are disposed between the battery cells and the end plates and between the battery cells and the section plates.

For example, in the battery block 1 illustrated in FIG. 9, instead of the second spacers 3B and the third spacers 3C, spacers including a cooling gas passageways, i.e., the spacers including the notches 24, are disposed between the battery cells and the end plates 5 and between the battery cells and the section plates 6. In this case, the cooling air can be passed through both ends in the arranged direction at which the end plates 5 are disposed, and through the three positions along the arranged direction at which the section plates 6 are disposed.

Thus, the battery cells 2 disposed adjacent to the battery cells 2 adjacent to the end plates 5 are subjected to absorption of heat by the cooling gas passing through the passageway of the spacers disposed between the battery cells 2 and the end plates 5, and to the absorption of heat by the cooling gas passing through the passageway of the spacers disposed on the opposite side from the end plates 5. Further, there is also the additional absorption of heat by the transfer of heat to the end plates 5. Similarly, the battery cells 2 disposed adjacent to the battery cells 2 adjacent to the section plates 6 are subjected to the absorption of heat by the cooling gas passing through the passageway of the spacers disposed between the battery cells and the section plates 6, and to the absorption of heat by the cooling gas passing through the passageway of the spacers disposed on the opposite side from the section plates 6. Further, there is also the additional absorption of heat by the transfer of heat to the section plates 6.

Thus, compared with the other battery cells 2 that are adjacent to each other which are cooled only by the absorption of heat by the cooling gas, the temperature is lowered. For example, as illustrated in FIG. 11, the battery cells 2 at positions closer to the end plates 5 or the section plates 6 have lower temperatures, while the battery cells 2 farther away from the end plates 5 or the section plates 6 have higher temperatures. Thus, the battery cells 2 in the same battery block 1 have large temperature differences, resulting in an uneven temperature distribution.

Particularly, when the end plates 5 and the section plates 6 are made from a metal material, such as aluminum alloy, in order to increase the rigidity of the battery block 1, more heat may be absorbed because of higher heat conductivity of the metal material. As a result, the temperature difference between the battery cells 2 increases, and the degree of temperature distribution unevenness becomes pronounced.

On the other hand, in the battery block 1 according to the present invention, the second spacers 3B with thermal insulating property are disposed between the battery cells 2 and the end plates 5 for suppressing heat transmission. Further, between the battery cells 2 and the section plates 6, the third spacers 3C with thermal insulating property are disposed for suppressing heat transmission. Thus, the temperature difference between the battery cells 2 adjacent to the end plates 5 or the section plates 6 and the other battery cells 2 adjacent to each other can be decreased, whereby the temperature distribution can be suppressed from becoming uneven. Particularly, because the second spacers 3B and the third spacers 3C are configured to block the flow of cooling gas between the battery cells 2 and the end plates 5, the temperature difference can be even more decreased. Accordingly, the degree of degradation of the battery cells 2 can be made uniform, whereby stable battery performance and an increase in battery life can be achieved.

By the second spacers 3B and the third spacers 3C, the gap between the end plates 5 and the battery cells 2, and the gap between the section plates 6 and the battery cells 2 are heat-insulated. Thus, the end plates 5 and the section plates 6 can be made from metal material, whereby high rigidity of the battery block 1 can be ensured. Further, because the second spacers 3B and the third spacers 3C do not include the space for allowing the flow of the cooling gas, the second spacers 3B and the third spacers 3C can be made smaller in size than the first spacers 3A, whereby a decrease in the size of the battery block can be achieved.

Figure 12:
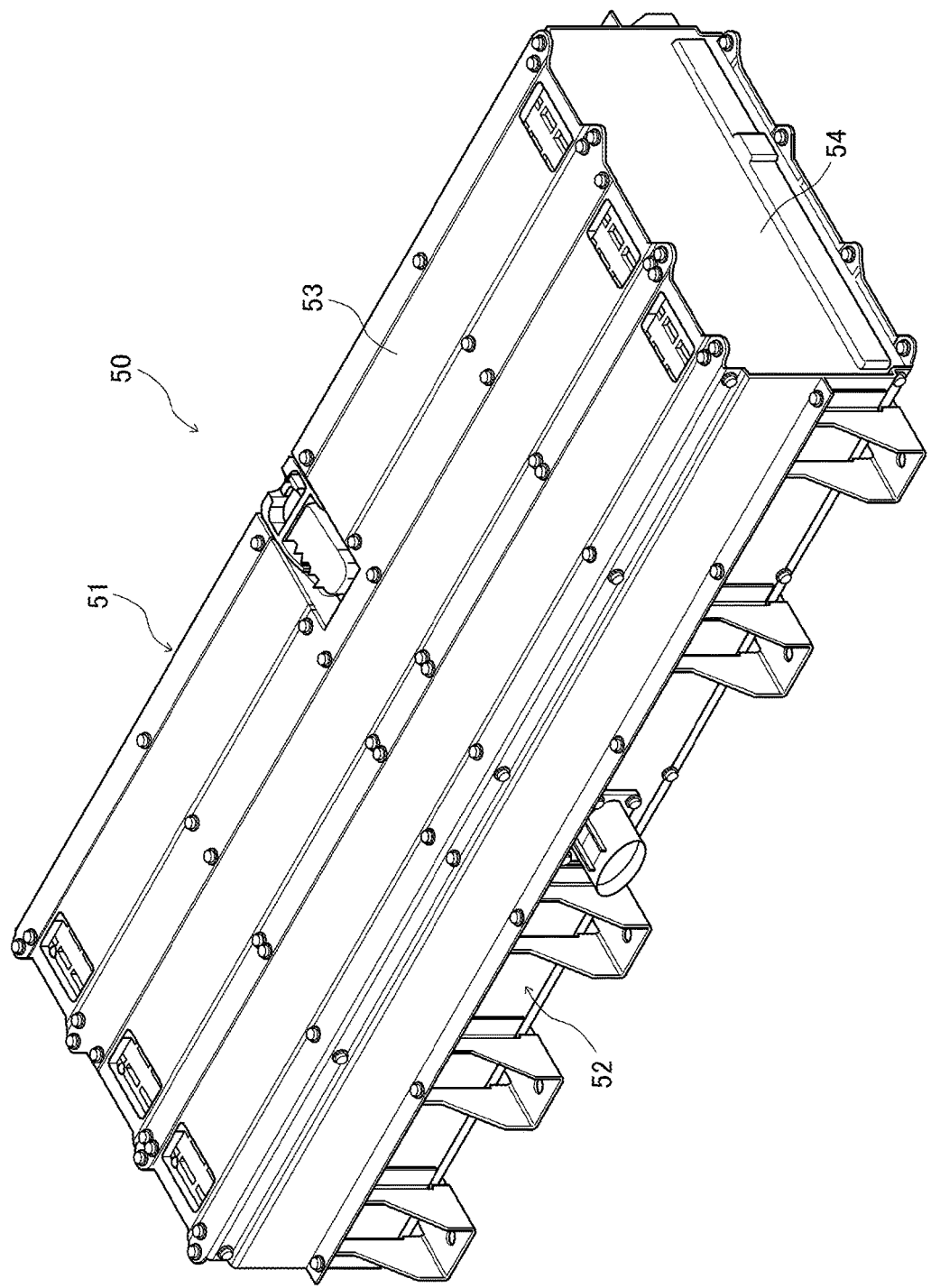
FIG. 12 is a perspective view of another example of the battery module using the battery block of FIG. 1.
Figure 13:
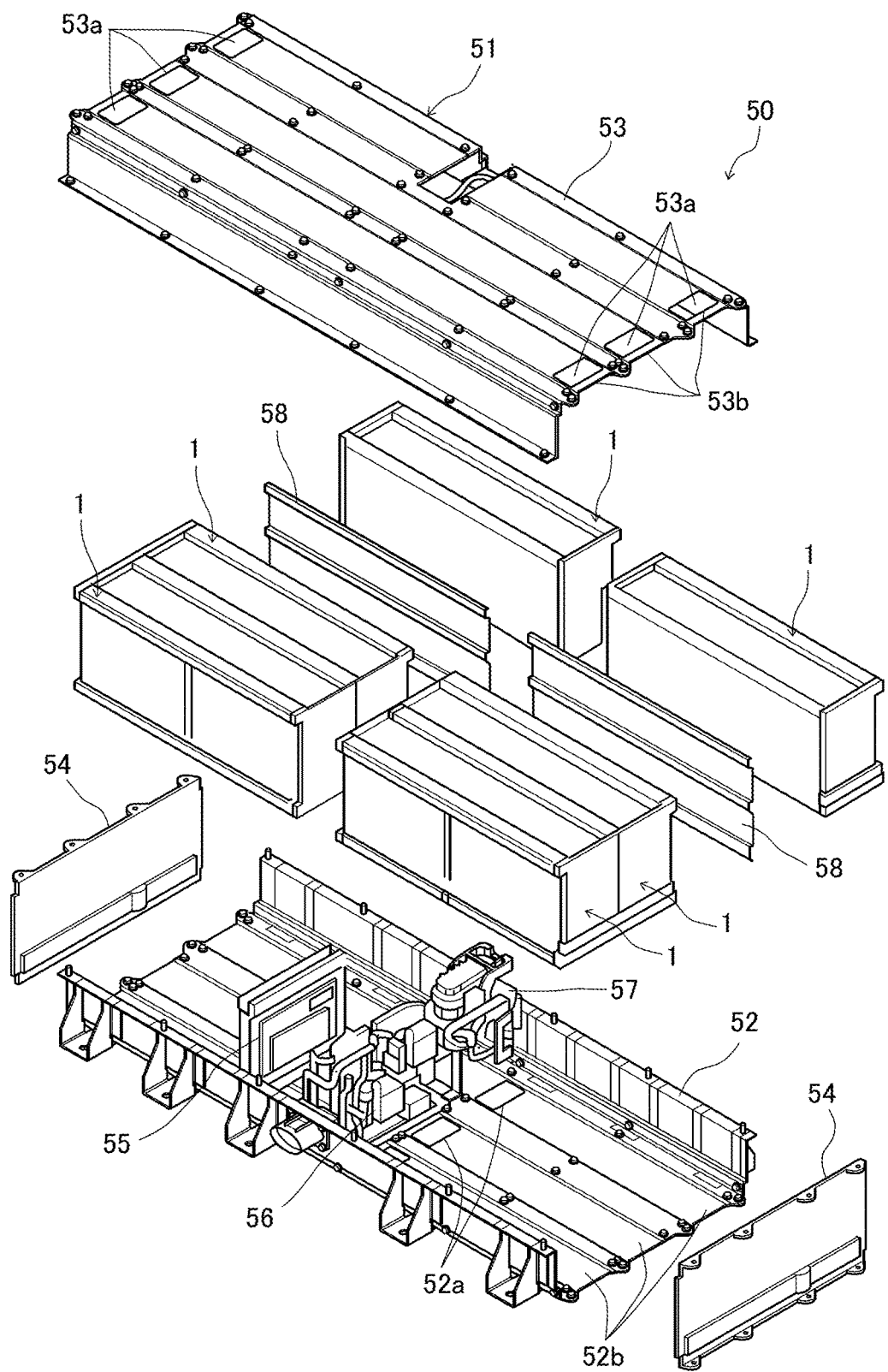
FIG. 13 is a block arrangement diagram of the battery block according to the example of FIG. 12.
Figure 14:
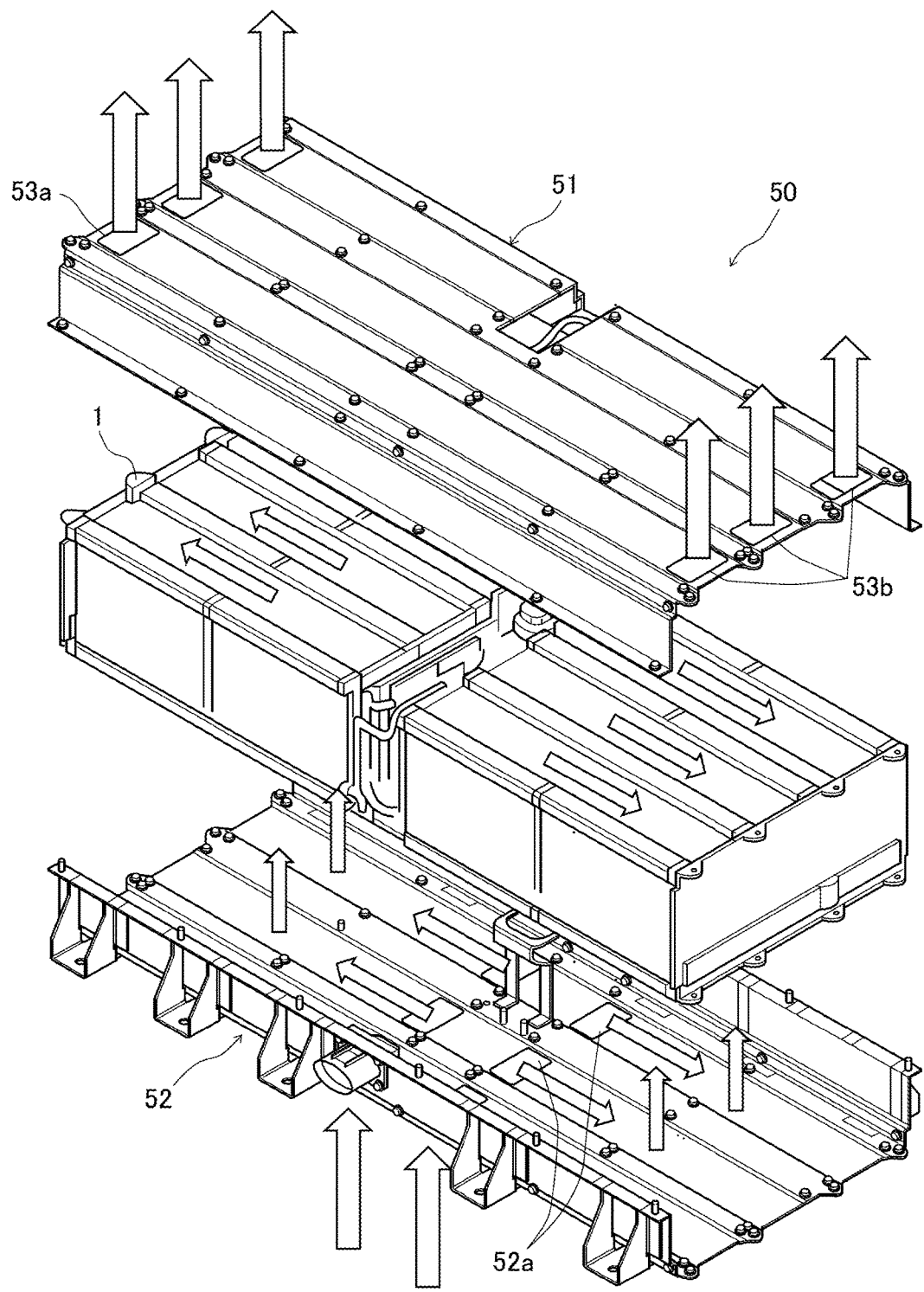
FIG. 14 illustrates the flow of cooling air in the example of FIG. 12.

FIG. 12 is a perspective view of another example of the battery module. FIG. 13 is an exploded perspective view of the battery module of FIG. 12. FIG. 14 illustrates cooling gas flow passageways in the battery module of FIG. 12.

A battery module 50 illustrated in FIG. 12 has a configuration including a total of six battery blocks 1 of FIG. 1 which are divided in the arranged direction into two groups of three arranged in parallel. The battery blocks 1 include two pairs of the battery cells 2 disposed with their sides opposite to the terminals 2a and 2b facing back to back, and two battery cells 2 disposed next to the pairs via partition plates 58 with their terminals 2a and 2b positioned on the opposite side from the partition plates 58 side. The battery blocks 1 are secured in the case 51 with the end plates 5 and the section plates 6 being fastened to the base 52 and the cover 53 of the case 51.

As illustrated in FIG. 12 and FIG. 13, the case 51 includes a base 52 and a cover 53 each having U-cross section which are joined to each other, and side plates 54, 54 closing both ends in the long side direction. At the center in the long side direction in the case 51, a battery management system (BMS) 55, a junction box 56, and a cut-off switch 57 are housed, with the battery blocks 1 disposed on either side in the long side direction. The battery management system (BMS) 55 and the junction box 56 are directly fastened and secured to the bottom surface of the base 52. The cut-off switch 57 is fastened and secured to a step formed on the base 52. On the sides of the base 52, connectors are provided.

At substantially the center in the bottom surface of the base 52, openings for cooling air inlets 52a are formed. The bottom surface of the base 52 is provided with recessed grooves 52b extending along the arranged direction of the battery cells 2, forming spaces from the side surfaces of the battery blocks 1 on one side in the cell width direction. At points of contact between the battery blocks 1 and the base 52, seals are disposed so as to prevent leakage of the cooling air to other portions.

At both ends of the cover 53 in the long side direction, openings for cooling air exits 53a are formed. The upper surface of the cover 53 is provided with recess grooves 53b along the arranged direction of the battery cells 2, forming spaces from the side surfaces of the battery blocks 1 on the other side in the cell width direction. At points of contact between the battery blocks 1 and the cover 53, seals are provided so as to prevent leakage of cooling air to the other portions.

The spaces formed by the recessed grooves 52b of the base 52 and the recess grooves 53b of the cover 53 between the base 52 and the battery blocks 15 and between the cover 53 and the battery blocks 15 provide fluid passageways for adjusting the temperature of the battery cells 2.

As illustrated in FIG. 14, the cooling air is introduced via the cooling air inlets 52a into the case 51, passed through the recessed grooves 52b of the base 52, and then caused to flow between the battery cells 2 from one side of the battery blocks 1 in the cell width direction. The cooling air then flows from between the battery cells 2 to the other side of the battery blocks 1 in the cell width direction, passes along the recess grooves 53b, and is discharged out of the case 51 via the cooling air exits 53a. When the cooling air passes through the gaps provided between the battery cells 2, heat exchange occurs due to a temperature difference between the battery cells 2 and the cooling air, whereby the temperature of the battery cells 2 is adjusted.

When the gas release valves 2f of the battery cells 2 are opened, the gas ejected from the gas release valves 2f is sprayed onto the side surfaces of the cover 53 or the partition plates 58. Thus, the gas remains within the case 51, and may be discharged out of the case 51 via a gas outlet which is not shown.

Between the base 52 and the battery blocks 1, and between the cover 53 and the battery blocks 1, the seals are provided. Thus, the spaces formed by the recessed grooves 52b and 53b are isolated within the case 51. Accordingly, the gas ejected into the case 51 can be prevented from flowing into the fluid passageways, so that the cooling air passed via the fluid passageways and the gas released from the battery cells 2 can be separately discharged.

In the battery module 50 with the above configuration, the end plates 5 and the section plates 6 are directly secured to the base 52 and the cover 53 of the case 51. Thus, the battery cells 2 can be strongly secured in a simplified structure, and overall decreases in size and weight can be achieved. Further, the number of the battery cells 2 or the battery blocks 1 can be increased or decreased to respond to voltage or capacity demands quickly and easily.

In the foregoing embodiments, lithium ion secondary batteries have been described as an example of the plurality of battery cells. However, it should be obvious that this is not a limitation and that a plurality of battery cells of other batteries or secondary batteries, such as nickel hydride batteries, may be arranged and configured.

While embodiments of the present invention have been described, the present invention is not limited to the foregoing embodiments, and various design modifications may be made without departing from the spirit and scope of the present invention as set forth in the claims. The embodiments have been described in detail for facilitating an understanding of the present invention, and are not limited to have all of the described configuration. For example, part of the configuration of one embodiment may be replaced with the configuration of another embodiment, or the configuration of the other embodiment may be incorporated into the configuration of the one embodiment. Further, with respect to part of the configuration of each embodiment, addition of another configuration, deletion, or substitution may be made.

REFERENCE SIGNS LIST

1 Battery block
2 Battery cell
3 Spacer
3A First spacer
3B Second spacer
3C Third spacer
4 Bridge bar
5 End plate
6 Section plate
7 Connection plate
21 Opposite wall (first opposite wall)
21' Opposite wall (second opposite wall)
24 Notch
29 Hollow part
40, 50 Battery module
41, 51 Case

The invention claimed is:

1. A battery block comprising:
a plurality of arranged battery cells;
a pair of end plates disposed at both ends of the plurality of battery cells in an arranged direction;
a plurality of first spacers respectively disposed between the plurality of battery cells and having a space allowing a flow of cooling gas;
a second spacer disposed between the battery cells and each end plate and having a thermal insulating property for suppressing heat transmission between the battery cells and each end plate, wherein
the battery cells include a flat and rectangular battery can having a pair of wider side surfaces;
a first spacer of the plurality of first spacers includes a first opposite wall opposite the wider side surfaces of the battery can and a notch opened in the first opposite wall and extending along a cell width direction of the battery cells with a constant height and width for the flow of the cooling gas, wherein the first opposite wall includes a first end and a second end that overlap with an adjacent first spacer of the plurality of first spacers; and
the first end and the second end include projection portions that form a combined projection portion when aligned with the adjacent first spacer; and
a plurality of bridge bars with recess portions that engage the combined projection portion.

2. The battery block according to claim 1, wherein each second spacer has a structure that blocks the flow of the cooling gas between the battery cells and each end plate.

3. The battery block according to claim 2, wherein:
each second spacer includes a second opposite wall opposite the wider side surfaces of the battery can and including a hollow part recessed in the second opposite wall and extending along the cell width direction of the battery cells at a height position opposite the notch of the first spacer and with the same height and width as the notch.

4. The battery block according to claim 1, wherein each second spacer is at least partially formed from a foam member.

5. The battery block according to claim 1, wherein the end plates are made of a metal material.

6. The battery block according to claim 3, comprising:
at least one section plate disposed at an intermediate position along the arranged direction of the plurality of battery cells and partitioning the plurality of battery cells to one side and another side in the arranged direction; and
a third spacer disposed between the battery cells and the section plate and having a thermal insulating property for suppressing heat transmission between the battery cells and the section plate.

7. The battery block according to claim 6, wherein the third spacer has a structure that blocks the flow of the cooling gas between the battery cells and the section plate.

8. The battery block according to claim 7, wherein the third spacer includes a third opposite wall opposite the wider side surfaces of the battery can, and a hollow part recessed in the third opposite wall and extending along the cell width direction of the battery cells at a height position opposite the notch of the first spacer and with the same height and width as the notch.

9. The battery block according to claim 6, wherein the third spacer is at least partially formed from a foam member.

10. The battery block according to claim 6, wherein the section plate is made of a metal material.

11. A battery module using the battery block according to claim 1.

* * * * *